US012724732B2

(12) United States Patent
Sakharshete et al.

(10) Patent No.: US 12,724,732 B2
(45) Date of Patent: Sep. 1, 2026

(54) CHIPLET-INTEGRATED MACHINE LEARNING ACCELERATORS

(71) Applicant: Advanced Micro Devices, Inc., Santa Clara, CA (US)

(72) Inventors: Swapnil P. Sakharshete, San Diego, CA (US); Andrew S. Pomianowski, Santa Clara, CA (US); Maxim V. Kazakov, San Diego, CA (US); Vineet Goel, San Diego, CA (US); Milind N. Nemlekar, San Diego, CA (US); Skyler Jonathon Saleh, San Diego, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 1004 days.

(21) Appl. No.: 16/933,863

(22) Filed: Jul. 20, 2020

(65) Prior Publication Data

US 2021/0026686 A1 Jan. 28, 2021

Related U.S. Application Data

(60) Provisional application No. 62/877,249, filed on Jul. 22, 2019, provisional application No. 62/877,241, filed on Jul. 22, 2019.

(51) Int. Cl.
*G06F 13/28* (2006.01)
*G06F 9/30* (2018.01)
(Continued)

(52) U.S. Cl.
CPC .......... *G06F 13/28* (2013.01); *G06F 9/30036* (2013.01); *G06F 9/30038* (2023.08);
(Continued)

(58) Field of Classification Search
None
See application file for complete search history.

(56) References Cited

U.S. PATENT DOCUMENTS

| | | | |
|---|---|---|---|
| 9,710,265 B1 | 7/2017 | Temam et al. | |
| 10,592,420 B1 * | 3/2020 | Liang | G06F 12/0871 |

(Continued)

FOREIGN PATENT DOCUMENTS

| | | |
|---|---|---|
| CN | 108804077 A | 11/2018 |
| CN | 109388777 A | 2/2019 |

(Continued)

OTHER PUBLICATIONS

Zimmer, Brian, et al., “A 0.11 pJ/Op, 0.32-128 TOPS, Scalable Multi-Chip-Module-based Deep Neural Network Accelerator with Ground-Reference Signaling in 16nm”, 2019 Symposium on VLSI Circuits Digest of Technical Papers, 2 pgs., 2019.

(Continued)

*Primary Examiner* — Wynuel S Aquino
(74) *Attorney, Agent, or Firm* — Volpe Koenig

(57) ABSTRACT

Techniques for performing machine learning operations are provided. The techniques include configuring a first portion of a first chiplet as a cache; performing caching operations via the first portion; configuring at least a first sub-portion of the first portion of the chiplet as directly-accessible memory; and performing machine learning operations with the first sub-portion by a machine learning accelerator within the first chiplet.

18 Claims, 6 Drawing Sheets

(51) Int. Cl.

| | |
|---|---|
| ***G06F 9/38*** | (2018.01) |
| ***G06F 9/48*** | (2006.01) |
| ***G06F 12/0893*** | (2016.01) |
| ***G06F 12/128*** | (2016.01) |
| ***G06F 18/214*** | (2023.01) |
| ***G06N 20/00*** | (2019.01) |

(52) U.S. Cl.

CPC .......... *G06F 9/3816* (2013.01); *G06F 9/3877* (2013.01); *G06F 9/3887* (2013.01); *G06F 9/38885* (2023.08); *G06F 9/4881* (2013.01); *G06F 12/0893* (2013.01); *G06F 12/128* (2013.01); *G06N 20/00* (2019.01); *G06F 18/214* (2023.01); *G06F 2212/1021* (2013.01)

(56) References Cited

U.S. PATENT DOCUMENTS

| | | | | |
|---|---|---|---|---|
| 10,691,593 | B1* | 6/2020 | Korzh | G06F 12/0862 |
| 2005/0268038 | A1 | 12/2005 | Yasue | |
| 2007/0115290 | A1* | 5/2007 | Polzin | G06F 1/3203 345/501 |
| 2010/0188411 | A1 | 7/2010 | Semiannikov et al. | |
| 2014/0281333 | A1* | 9/2014 | Peterson | G06F 12/1009 711/170 |
| 2015/0161052 | A1 | 6/2015 | Seong | |
| 2016/0224465 | A1 | 8/2016 | Morad et al. | |
| 2017/0186740 | A1* | 6/2017 | Cok | H01L 25/167 |
| 2017/0277659 | A1 | 9/2017 | Akerib et al. | |
| 2017/0323224 | A1 | 11/2017 | Bruestle et al. | |
| 2018/0024938 | A1* | 1/2018 | Paltashev | G06F 12/128 711/133 |
| 2018/0052631 | A1 | 2/2018 | Kalyanasundharam et al. | |
| 2018/0121377 | A1 | 5/2018 | Woo et al. | |
| 2018/0157967 | A1 | 6/2018 | Henry et al. | |
| 2018/0181488 | A1 | 6/2018 | Fowler et al. | |
| 2018/0315398 | A1 | 11/2018 | Kaul et al. | |
| 2019/0042923 | A1 | 2/2019 | Janedula et al. | |
| 2019/0057300 | A1 | 2/2019 | Mathuriya et al. | |
| 2019/0114533 | A1 | 4/2019 | Ng et al. | |
| 2019/0146837 | A1* | 5/2019 | Ki | G06F 9/52 718/107 |
| 2019/0196742 | A1 | 6/2019 | Yudanov et al. | |
| 2019/0251043 | A1* | 8/2019 | Park | G06F 11/3037 |
| 2019/0278593 | A1* | 9/2019 | Elango | G06F 8/447 |
| 2020/0098082 | A1* | 3/2020 | Gutierrez | G06F 12/02 |
| 2020/0311604 | A1* | 10/2020 | Gebre | G06N 3/063 |
| 2020/0342350 | A1* | 10/2020 | Madar, III | G06N 20/00 |
| 2020/0410389 | A1* | 12/2020 | Jain | G06F 9/44505 |

FOREIGN PATENT DOCUMENTS

| | | | |
|---|---|---|---|
| JP | 2005339557 | A | 12/2005 |
| JP | 2012515992 | A | 7/2012 |
| JP | 2015064863 | A | 4/2015 |
| JP | 2018092562 | A | 6/2018 |
| WO | 2018034875 | A1 | 2/2018 |

OTHER PUBLICATIONS

Mounce, G., et al., "Chiplet Based Aproach for Heterogenous Processing and Packaging Architectures", 2016 IEEe Aerospace Conference, Jun. 30, 2016, 12 pgs.

Yong, L., Application and Research of MPC Chips and its Memory Control Technology, Microprocessors, Aug. 2001, 5 pgs.

Sheng, Y., et al., "Design and implementation of assembly language learning system based based on CPU simulator", Journal of Central South University (Science and Technology), Oct. 26, 2010, 7 pgs.

* cited by examiner

CHIPLET-INTEGRATED MACHINE LEARNING ACCELERATORS

CROSS REFERENCE TO RELATED APPLICATIONS

This application claims the priority benefit of U.S. Provisional Application No. 62/877,241, entitled "CHIPLET APPROACH FOR COUPLING GPU WITH MACHINE LEARNING ACCELERATION AT HIGH POWER EFFICIENCY," filed on Jul. 22, 2019, which is incorporated by reference as if fully set forth herein. This application claims the priority benefit of U.S. Provisional Application No. 62/877,249, entitled "HIGH BW INTER-CONNECTED CHIPLETS AND GPU FOR HIGH PERFORMANCE GAMING AND MACHINE LEARNING WORKLOADS," filed on Jul. 22, 2019, which is incorporated by reference as if fully set forth herein.

BACKGROUND

Machine learning is a rapidly advancing field. Improvements to hardware for machine learning operations such as training and inference are constantly being made.

BRIEF DESCRIPTION OF THE DRAWINGS

A more detailed understanding can be had from the following description, given by way of example in conjunction with the accompanying drawings wherein.

DETAILED DESCRIPTION

Techniques for performing machine learning operations are provided. The techniques include configuring a first portion of a first chiplet as a cache; performing caching operations via the first portion; configuring at least a first sub-portion of the first portion of the chiplet as directly-accessible memory; and performing machine learning operations with the first sub-portion by a machine learning accelerator within the first chiplet.

Figure 1:
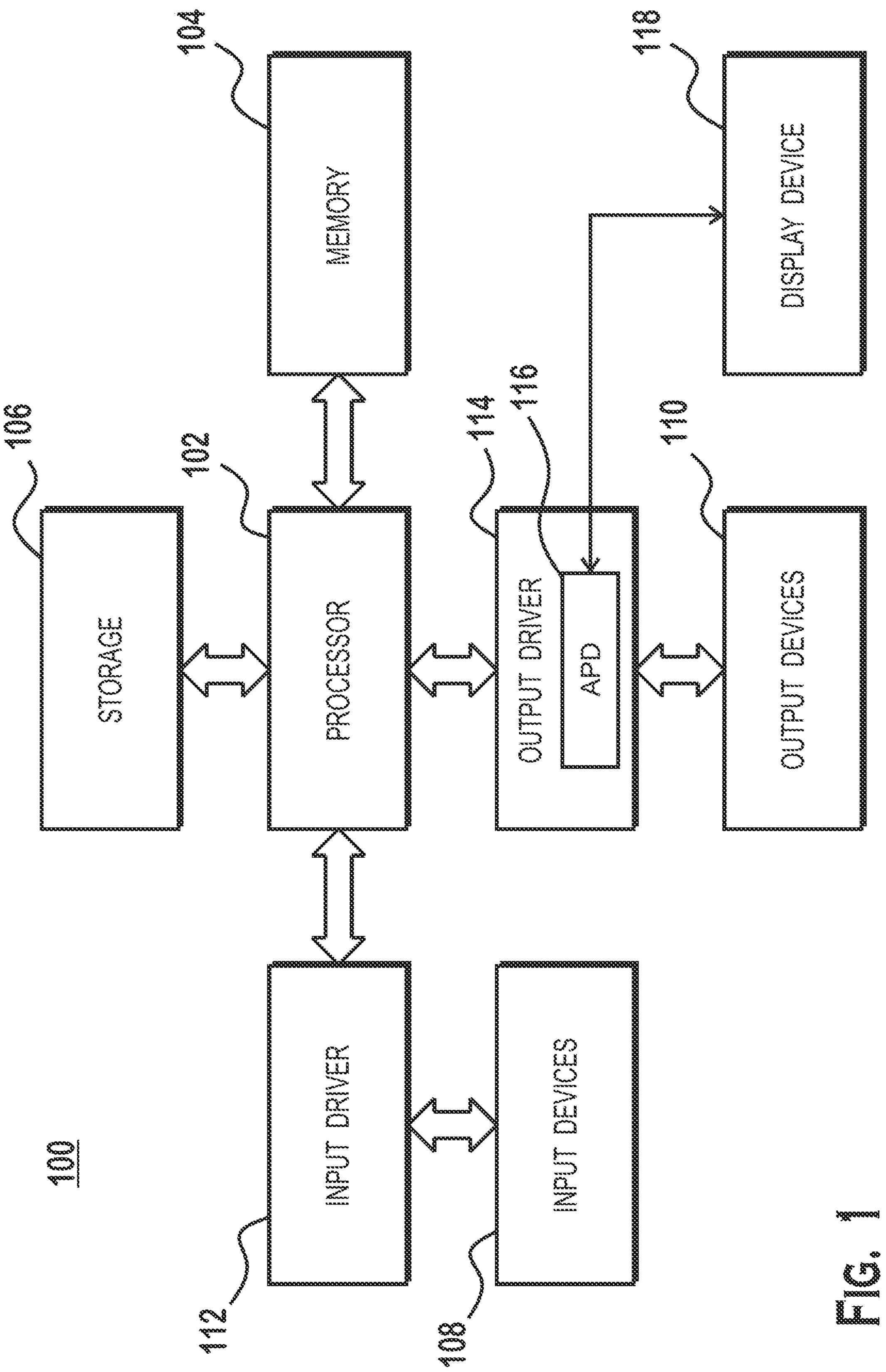
FIG. 1 is a block diagram of an example device in which one or more features of the disclosure can be implemented.

FIG. 1 is a block diagram of an example device 100 in which one or more features of the disclosure can be implemented. The device 100 could be one of, but is not limited to, for example, a computer, a gaming device, a handheld device, a set-top box, a television, a mobile phone, a tablet computer, or other computing device. The device 100 includes a processor 102, a memory 104, a storage 106, one or more input devices 108, and one or more output devices 110. The device 100 also includes one or more input drivers 112 and one or more output drivers 114. Any of the input drivers 112 are embodied as hardware, a combination of hardware and software, or software, and serve the purpose of controlling input devices 112 (e.g., controlling operation, receiving inputs from, and providing data to input drivers 112). Similarly, any of the output drivers 114 are embodied as hardware, a combination of hardware and software, or software, and serve the purpose of controlling output devices (e.g., controlling operation, receiving inputs from, and providing data to output drivers 114). It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, without limitation, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 and output driver 114 include one or more hardware, software, and/or firmware components that are configured to interface with and drive input devices 108 and output devices 110, respectively. The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. The output driver 114 includes an accelerated processing device ("APD") 116 which is coupled to a display device 118, which, in some examples, is a physical display device or a simulated device that uses a remote display protocol to show output. The APD 116 is configured to accept compute commands and graphics rendering commands from processor 102, to process those compute and graphics rendering commands, and to provide pixel output to display device 118 for display. As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and configured to provide graphical output to a display device 118. For example, it is contemplated that any processing system that performs processing tasks in accordance with a SIMD paradigm may be configured to perform the functionality described herein. Alternatively, it is contemplated that computing systems that do not perform processing tasks in accordance with a SIMD paradigm performs the functionality described herein.

Figure 2:
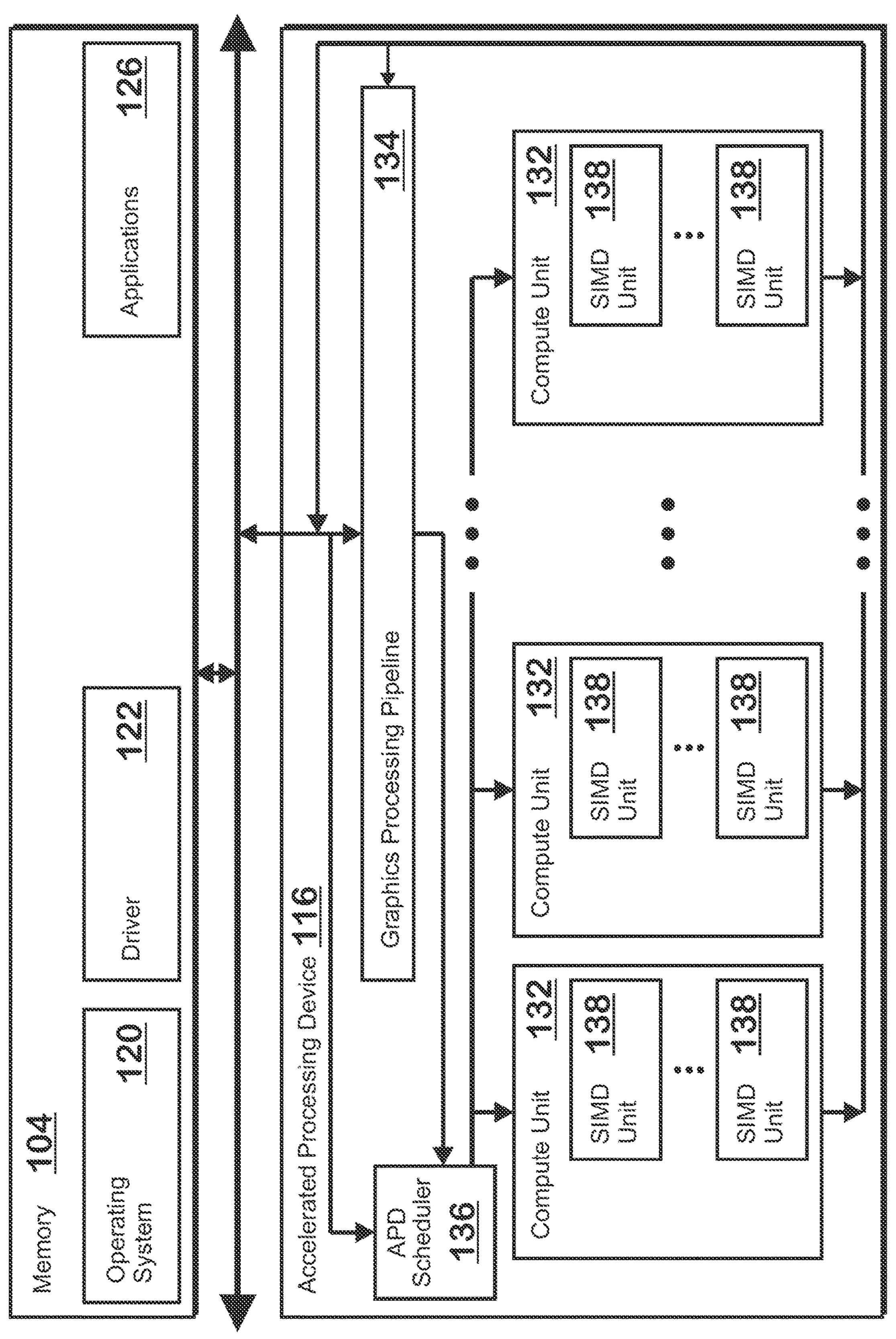
FIG. 2 illustrates details of the device of FIG. 1, according to an example.

FIG. 2 illustrates details of the device 100 and the APD 116, according to an example. The processor 102 (FIG. 1) executes an operating system 120, a driver 122, and applications 126, and may also execute other software alternatively or additionally. The operating system 120 controls various aspects of the device 100, such as managing hardware resources, processing service requests, scheduling and controlling process execution, and performing other operations. The APD driver 122 controls operation of the APD 116, sending tasks such as graphics rendering tasks or other work to the APD 116 for processing. The APD driver 122 also includes a just-in-time compiler that compiles programs for execution by processing components (such as the SIMD units 138 discussed in further detail below) of the APD 116.

The APD 116 executes commands and programs for selected functions, such as graphics operations and non-graphics operations that may be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102. In some examples, these compute processing operations are performed by executing compute shaders on the SIMD units 138.

The APD 116 includes compute units 132 that include one or more SIMD units 138 that are configured to perform operations at the request of the processor 102 (or another unit) in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. Work-items can be executed simultaneously (or partially simultaneously and partially sequentially) as a "wavefront" on a single SIMD processing unit 138. One or more wavefronts are included in a "work group," which includes a collection of work-items designated to execute the same program. A work group can be executed by executing each of the wavefronts that make up the work group. In alternatives, the wavefronts are executed on a single SIMD unit 138 or on different SIMD units 138. Wavefronts can be thought of as the largest collection of work-items that can be executed simultaneously (or pseudo-simultaneously) on a single SIMD unit 138. "Pseudo-simultaneous" execution occurs in the case of a wavefront that is larger than the number of lanes in a SIMD unit 138. In such a situation, wavefronts are executed over multiple cycles, with different collections of the work-items being executed in different cycles. An APD scheduler 136 is configured to perform operations related to scheduling various workgroups and wavefronts on compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

Figure 3:
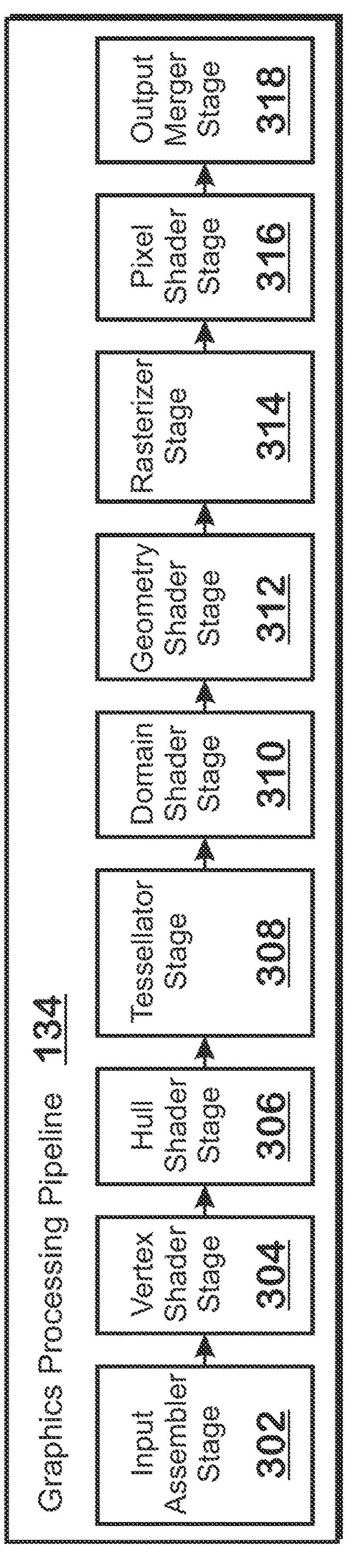
FIG. 3 is a block diagram showing additional details of the graphics processing pipeline illustrated in FIG. 2.

FIG. 3 is a block diagram showing additional details of the graphics processing pipeline 134 illustrated in FIG. 2. The graphics processing pipeline 134 includes stages that each performs specific functionality of the graphics processing pipeline 134. Each stage is implemented partially or fully as shader programs executing in the programmable compute units 132, or partially or fully as fixed-function, non-programmable hardware external to the compute units 132.

The input assembler stage 302 reads primitive data from user-filled buffers (e.g., buffers filled at the request of software executed by the processor 102, such as an application 126) and assembles the data into primitives for use by the remainder of the pipeline. The input assembler stage 302 can generate different types of primitives based on the primitive data included in the user-filled buffers. The input assembler stage 302 formats the assembled primitives for use by the rest of the pipeline.

The vertex shader stage 304 processes vertices of the primitives assembled by the input assembler stage 302. The vertex shader stage 304 performs various per-vertex operations such as transformations, skinning, morphing, and per-vertex lighting. Transformation operations include various operations to transform the coordinates of the vertices. These operations include one or more of modeling transformations, viewing transformations, projection transformations, perspective division, and viewport transformations, which modify vertex coordinates, and other operations that modify non-coordinate attributes.

The vertex shader stage 304 is implemented partially or fully as vertex shader programs to be executed on one or more compute units 132. The vertex shader programs are provided by the processor 102 and are based on programs that are pre-written by a computer programmer. The driver 122 compiles such computer programs to generate the vertex shader programs having a format suitable for execution within the compute units 132.

The hull shader stage 306, tessellator stage 308, and domain shader stage 310 work together to implement tessellation, which converts simple primitives into more complex primitives by subdividing the primitives. The hull shader stage 306 generates a patch for the tessellation based on an input primitive. The tessellator stage 308 generates a set of samples for the patch. The domain shader stage 310 calculates vertex positions for the vertices corresponding to the samples for the patch. The hull shader stage 306 and domain shader stage 310 can be implemented as shader programs to be executed on the compute units 132 that are compiled by the driver 122 as with the vertex shader stage 304.

The geometry shader stage 312 performs vertex operations on a primitive-by-primitive basis. A variety of different types of operations can be performed by the geometry shader stage 312, including operations such as point sprite expansion, dynamic particle system operations, fur-fin generation, shadow volume generation, single pass render-to-cubemap, per-primitive material swapping, and per-primitive material setup. In some instances, a geometry shader program that is compiled by the driver 122 and that executes on the compute units 132 performs operations for the geometry shader stage 312.

The rasterizer stage 314 accepts and rasterizes simple primitives (triangles) generated upstream from the rasterizer stage 314. Rasterization includes determining which screen pixels (or sub-pixel samples) are covered by a particular primitive. Rasterization is performed by fixed function hardware.

The pixel shader stage 316 calculates output values for screen pixels based on the primitives generated upstream and the results of rasterization. The pixel shader stage 316 may apply textures from texture memory. Operations for the pixel shader stage 316 are performed by a pixel shader program that is compiled by the driver 122 and that executes on the compute units 132.

The output merger stage 318 accepts output from the pixel shader stage 316 and merges those outputs into a frame buffer, performing operations such as z-testing and alpha blending to determine the final color for the screen pixels.

An implementation of an APD 116 is disclosed that includes a graphics processing pipeline 134 and that is capable of performing graphics rendering. However, the teachings of the present disclosure extend to implementations of the APD 116 that do not include a graphics processing pipeline 134 or that do not perform graphics rendering utilizing such a pipeline.

Figure 4:
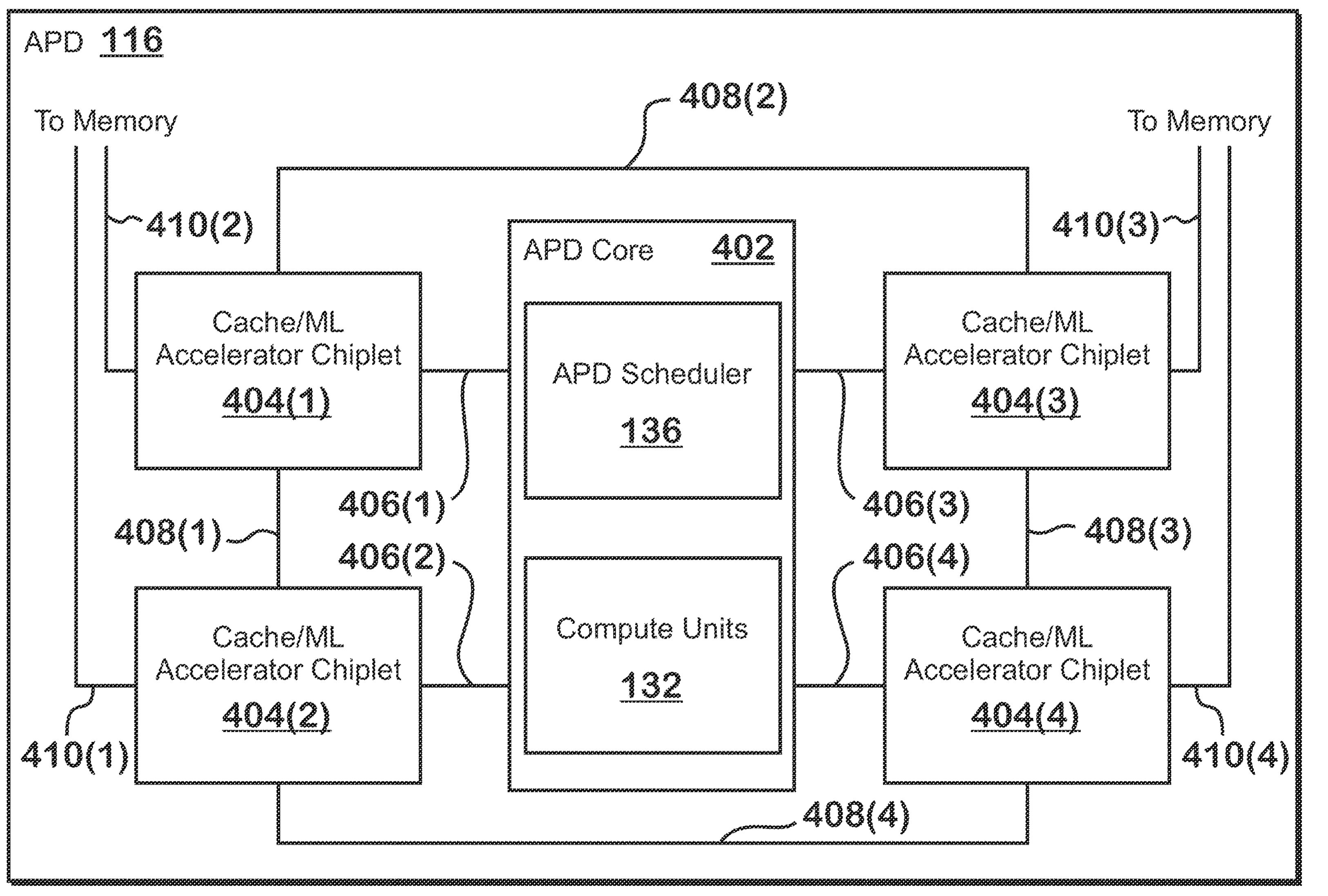
FIG. 4 represents a block diagram of the APD, illustrating details of cache/machine learning accelerator chiplets, according to an example.

FIG. 4 represents a block diagram of the APD 116, illustrating details of cache/machine learning accelerator chiplets 404, according to an example. The APD 116 includes the APD scheduler 136 and compute units 132 described with respect to FIG. 2. The APD 116 also includes one or more cache-and-machine-learning-accelerator chiplets 404 which are coupled to the APD core 402 via APD-to-cache interfaces 406 and to other memory (e.g., system memory 104 or memory of the APD 116) via external interfaces 410. In some implementations, one or more chiplets 404 are connected to one or more other chiplets 404 via one or more intra-chiplet interfaces 408.

The cache/machine learning accelerator chiplets 404 include memory modules configured to store data as well as machine learning accelerators. In some implementations, the machine learning accelerators include matrix multiplication circuits configured to perform matrix multiplication for input matrices to provide an output result.

In some implementations, the cache/machine learning accelerator chiplets 404 are separate physical dies than the APD core 402. In some implementations, the cache/machine learning accelerator chiplets 404 are fabricated with a larger scale fabrication process than the fabrication process used for the APD core 402. A fabrication process refers to the scale at which device features are manufactured. Fabrication processes are sometimes referred to in the art as "process nodes." Some example fabrication processes include the 10 nanometer ("nm") process and the 7 nm process. Using a larger fabrication process scale for the chiplets 404 as compared with the APD core 402 allows the chiplets 404 to be manufactured with lower cost and higher yield as compared with the APD core 402 while still providing for high performance of the APD core 402.

The memory modules of the cache/machine learning accelerator chiplets 404 are switchable between being used as cache memory for operations of the APD core 402 and as memory storing input operands and output results for operations of the machine learning accelerators. More specifically, the cache/machine learning accelerator chiplets 404 are configurable between operating as a cache memory for the APD core 402 and as directly accessible memory that can be accessed by, for example, the machine learning accelerators of the cache/machine learning accelerator chiplets 404. In some implementations, either or both of the APD scheduler 136 and the compute units 132 are capable of instructing any portion of any of the cache/machine learning accelerator chiplets 404 to operate as a cache or as directly accessible memory.

In some implementations, the APD core 402 includes one or more cache memories that form at least a part of a cache hierarchy. The memory hierarchy also includes the cache memory of the cache/machine learning accelerator chiplets 404. In some examples, the cache memory of the cache/machine learning accelerator chiplets 404 acts as a level 3 cache to the portion of the cache hierarchy of the APD core 402.

In some implementations, the cache/machine learning accelerator chiplets 404 also serve as the physical interface between the APD core 402 and memory that is higher up in the memory hierarchy than the cache hierarchy, such as memory dedicated to the APD 116 or system memory 104. In other words, the cache/machine learning accelerator chiplets 404 both contain memory that acts as a level in the cache hierarchy and physically interface with other levels of that hierarchy, including the lower levels in the APD core 402 and the higher levels such as memory in the APD 116 or system memory 104. Note that FIG. 4 illustrates the external interfaces 410 being connected "to memory." In various examples, the "memory" referred to is general purpose (e.g., non-cache) memory of the APD 116 or system memory 104. Thus the cache/machine learning accelerator chiplets 404 act as a physical interface between the portion of the cache hierarchy within the APD core 402 and the memory.

Figure 5:
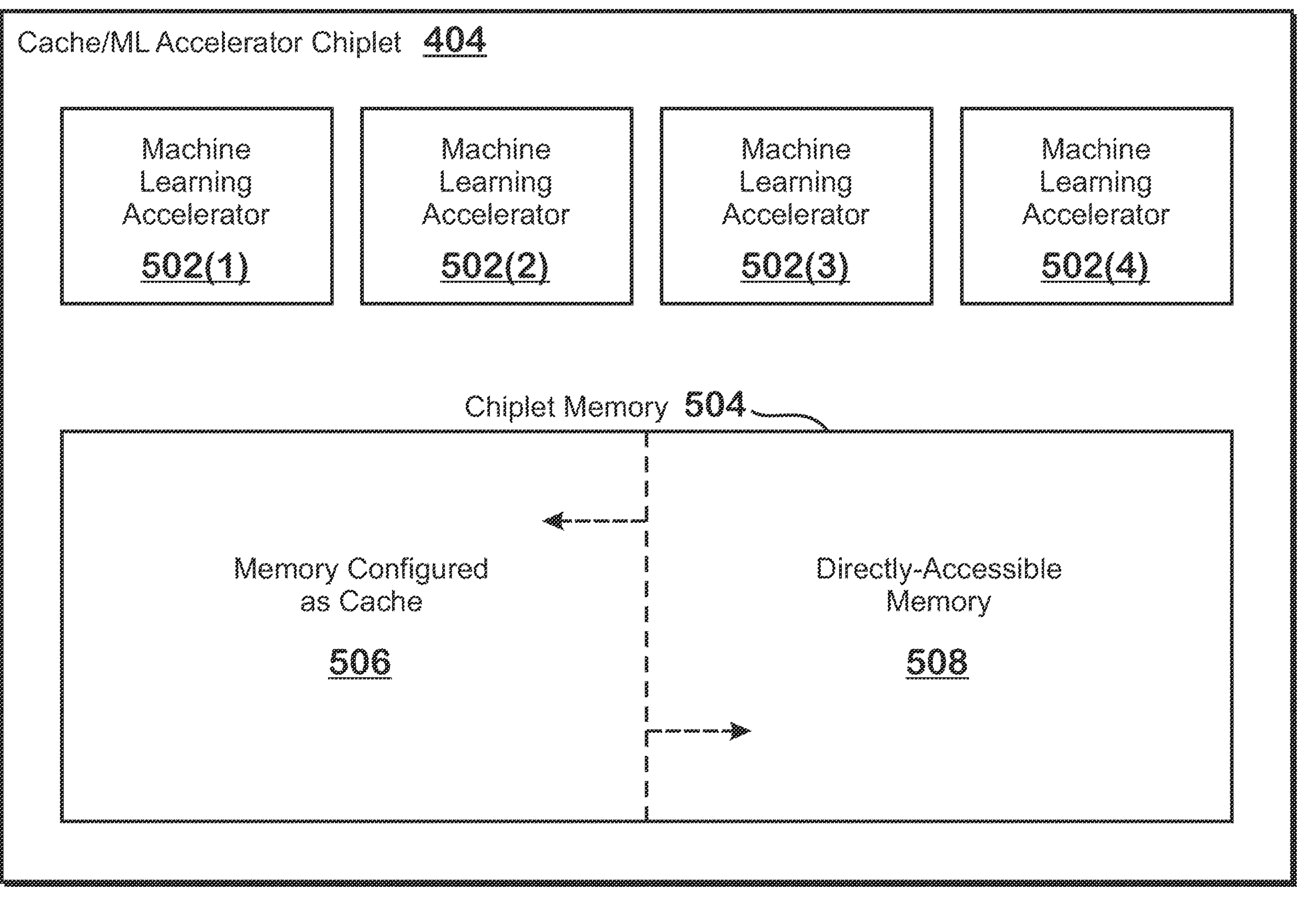
FIG. 5 illustrates details of a cache/machine learning accelerator chiplet, according to an example.

FIG. 5 illustrates details of a cache/machine learning accelerator chiplet 404, according to an example. As shown, the cache/machine learning accelerator chiplet 404 includes a plurality of machine learning accelerators 502 and a chiplet memory 504. The machine learning accelerators 502 are, in some implementations, hardware circuitry configured to perform matrix multiplication operations.

Matrix multiplication operations are used commonly in machine learning operations, such as to perform operations to generate a layer output from a layer input for fully connected layers or for convolution layers. In various examples, either or both of the APD scheduler 136 or the compute units 132 are capable of sending commands to any of the cache/machine learning accelerator chiplet 404 to fetch data into the chiplet memory 504 and perform matrix multiplication operations via the machine learning accelerators 502 on the fetched data to output a result. In various examples, the cache/machine learning accelerator chiplet 404 stores matrix multiplication results into the chiplet memory 504. In various examples, the cache/machine learning accelerator chiplet 404 transmits the results to an external entity such as the APD core 402, to memory of the APD 116, or to memory 102.

In some examples, a neural network is implemented as a series of interconnected layers. Each layer receives one or more inputs from a different layer or from the input to the neural network. It is possible for calculations of different layers to be performed by different entities of the device 100. In an example, the cache/machine learning accelerator chiplets 404 perform matrix multiplication or convolution operations and the APD core 402 (for example, the compute units 132) performs other calculations to implement a neural network such as activations, batch normalization, or other operations. In some examples, a coordinator such as the APD scheduler 136 or the processor 102, commands these different entities to perform the various operations for performing training or inference with a neural network. For example, the coordinator instructs the cache/machine learning accelerator chiplet 404 to perform matrix multiplication operations on input data for layers that require matrix multiplications and instructs the compute units 132 to perform other operations for the neural network for layers that utilize such other operations.

The APD scheduler 136 is capable of scheduling many different tasks for concurrent execution on different compute units 132 and cache/machine learning accelerator chiplets 404. In an example, the APD scheduler 136 is capable of scheduling shader programs for execution in the compute units 132 while also scheduling operations for execution on the cache/machine learning accelerator chiplets 404. As shown in FIG. 5, the chiplet memory 504 is configurable between memory configured as a cache 506 and directly-accessible memory 508. More specifically, an entity, such as the processor 102, the APD scheduler 136, or a compute unit 132, requests that a certain portion of the chiplet memory 504 for a particular cache/machine learning accelerator chiplet 404 be configured as either cache 506 or as directly-accessible memory 508. In response, the cache/machine learning accelerator chiplet 404 configures the requested portion as cache 506 or directly-accessible memory 508 and configures the remaining portion as the other of cache 506 or directly-accessible memory 508.

The memory configured as cache 506 serves as a typical cache memory. Specifically, the cache 506 serves as a higher level in the cache hierarchy than caches of the APD core 402. In an example, the memory configured as cache 506 serves as a level 3 cache memory and the APD core 402 includes one or more level 0 caches, one or more level 1 caches, and one or more level 2 caches. In such examples, the level 3 cache memory services misses from the level 2 cache, receives and stores evicted cache lines from the one or more level 2 caches, and evicts cache lines to a backing memory such as memory within the APD 116 or system memory 104. In some examples, the cache memory serves as cache for shader programs executing within the compute units 132 of the APD 116. Note that the memory configured as cache 506 is not "directly accessible" in the sense that an execution unit, such as a machine learning accelerator 502 or a compute unit 132 is not able to specifically request data be placed in such a cache 506. For example, with normal memory, an execution unit is able to request data be placed at an address in in that normal memory. However, with a cache, data is placed into the cache by a cache controller in response to actions such as misses in the cache and execution units only have indirect control of the data stored in a cache.

The directly-accessible memory 508 is, by contrast, directly accessible by execution units. The term "directly-accessible" means that an execution unit, such as the APD scheduler 136, a compute unit 132, or a machine learning accelerator 502, is able to explicitly request data be stored into or loaded from the directly-accessible memory 508. In some implementations, these requests specify the specific cache/machine learning accelerator chiplet 404 into which to store data or from which to read data, as well as an address within that cache/machine learning accelerator chiplet 404. As described elsewhere, the machine learning accelerators 502 are capable of, and sometimes do, perform machine learning operations such as matrix multiplications that consume data within the directly-accessible memory 508 of the same chiplet 404 and output results of the operations to the directly-accessible memory 508 of the same chiplet 404.

In some implementations, the chiplets 404 include inter-chiplet connections 408. As described elsewhere herein, the chiplets 404 obtain data from other sources and write data to other locations. In an example, a chiplet 404 performs an operation to produce an output that is consumed by a different chiplet 404. In implementations including the inter-chiplet connections 408, chiplets 404 are able to directly transmit or receive such data to/from other chiplets 404.

As described elsewhere herein, operations of the chiplets 404 and APD core 402 are performed for training or inference of a machine learning network. In some examples, a graph compiler (not shown) compiles a graph description of the machine learning network that indicates the layers of the network, the operations of each layer, the inputs for each layer, and the outputs for each layer. Inputs for any layer may be the output of a different layer or the input to the network and outputs for any layer may be the input of a different layer or the output of the network. The graph compiler generates a set of operations to be performed by the machine learning accelerators 502 of the chiplets 404, in some implementations, a set of operations to be performed by the APD scheduler 136, and, in some implementations, a set of shader programs to be executed by the compute units 132. In some implementations, one or more shader programs include instructions to perform operations for one or more layers. In some implementations, some such shader programs include instructions to request the machine learning accelerators 502 perform matrix multiplication operations required for such layers, and, optionally, include instructions to transmit data into the chiplet memory 504 configured as directly-accessible memory 508 for inputs to the layers. In some implementations, some such shader programs include instructions to move data from the directly-accessible memory 508 to a different memory such as a directly-accessible memory 508 of a different chiplet 404, or memory within the APD core 402. In some implementations, the APD scheduler 136, instead of or in addition to the compute units 132, performs operations to request the chiplets 404 perform machine learning accelerator operations and/or to perform operations to read in or write out data from or to the chiplets 404.

In some implementations, the chiplets 404 include a direct memory access engine that is configured to read data into directly-accessible memory 508 and/or to store data from the directly-accessible memory 508 to a different memory. In various alternative implementations, the compute units 132 or the APD scheduler 136 instruct the direct memory access engines to read in and/or write out data.

As described above, the chiplet memories 504 are configurable between cache 506 and directly accessible memory 508. It should be understood that a chiplet memory 504 may be configured such that a first portion is cache memory 506 and subsequently configured such that at least a portion of the first portion is directly-accessible memory 508. In other words, chiplet memory 404 that was once used as cache memory 506 can be repurposed as directly-accessible memory 508. Similarly, chiplet memory 404 that was once used as directly-accessible memory 508 can be repurposed as cache memory 506. It should also be understood that different portions of the same chiplet 404 that are configured as a cache and as directly-accessible, may be used concurrently. For example, it is possible to perform machine learning operations such as matrix multiplications on one chiplet 404 concurrently with perform cache operations for the APD 116.

Figure 6:
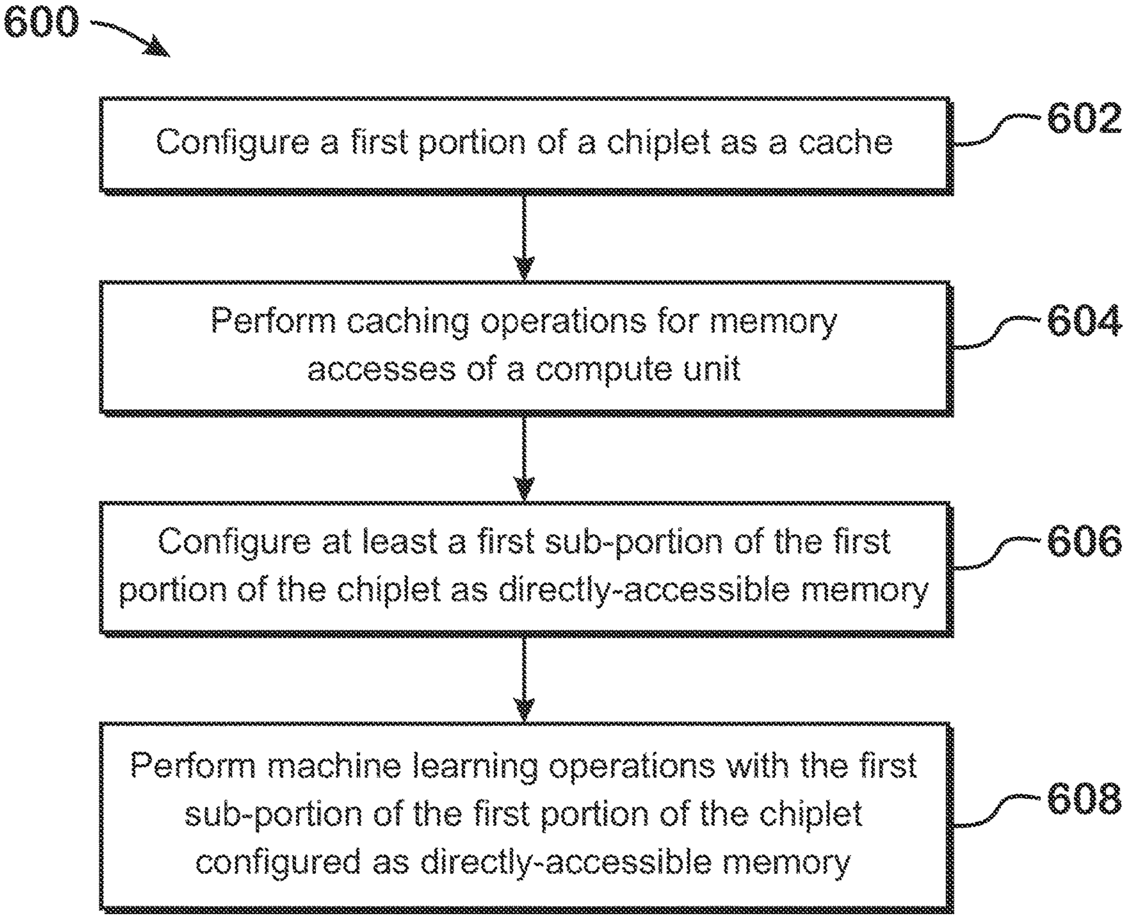
FIG. 6 is a flow diagram of a method for performing machine learning operations with a chiplet, according to an example.

FIG. 6 is a flow diagram of a method 600 for performing machine learning operations with a chiplet 404, according to an example. Although described with respect to the system of FIGS. 1-5, those of skill in the art will understand that any system configured to perform the steps of the method 600 in any technically feasible order falls within the scope of the present disclosure.

The method 600 begins at step 602, where a chiplet 404 configures a first portion of the chiplet memory 504 as a cache 506. In various examples, this configuration occurs at the request of the APD scheduler 136 or a compute unit 132.

At step 604, the APD 116 performs caching operations using the first portion configured as a cache 506. Caching operations include storing cache lines evicted from caches within the APD core 402, and providing cache lines upon request to the APD core 402.

At step 606, the chiplet 404 configures at least a first sub-portion of the first portion of the chiplet 404 as directly-accessible memory 508. In various examples, this configuration occurs at the request of the APD scheduler 136 or a compute unit 132. At step 608, the chiplet 404 performs machine learning operations with the first sub-portion of the first portion of the chiplet 404 which is configured as directly accessible. In various examples, performing machine learning operations includes performing a matrix multiplication for a layer of a machine learning network to obtain a result for that layer. In various examples, the operations also include operations to store data into the first sub-portion and to transmit data from the first sub-portion to an entity outside of the chiplet 404, such as another chiplet 404 and the APD core 402.

Each of the units illustrated in the figures represent hardware circuitry configured to perform the operations described herein, and certain units of the graphics processing pipeline 300 are programmable and can thus execute programs.

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method comprising:

performing caching operations for a graphics accelerator via a first portion of a cache that is present in a first chiplet, the first chiplet acting as an interface between the graphics accelerator and a system memory, the caching operations being performed as part of a cache hierarchy of the graphics accelerator, in response to a request for additional directly-accessible memory for use by an accelerator of the first chiplet, reconfiguring at least a first sub-portion of the first portion of the cache from being used as a cache to be used as directly-accessible memory, wherein the accelerator is configured to perform machine learning operations and to store input operands and output results into the directly-accessible memory;

accessing the first sub-portion by the accelerator within the first chiplet, wherein the accessing includes the accelerator explicitly requesting data be stored into or loaded from the first sub-portion, the explicitly requesting specifying an address within the first sub-portion; and transmitting data to or receiving data from a second chiplet that is physically separate from a processing core that requests the first chiplet to perform machine learning operations, wherein the data is transmitted or received via a direct connection between the first chiplet and the second chiplet that does not flow through the processing core.

2. The method of claim 1, wherein:

performing caching operations comprises performing caching operations for a processing core that is on a separate die as the first chiplet.

3. The method of claim 2, wherein:

performing caching operations for the processing core comprises one or more of storing a cache line evicted from a cache of the processing core or providing a cache line to the processing core in response to a miss in a cache of the processing core.

4. The method of claim 1, wherein:

configuring the first sub-portion as directly-accessible memory is performed in response to a request from a scheduler or a compute unit of a processing core that is on a separate die as the first chiplet.

5. The method of claim 1, further comprising:

storing, in response to a request of a processor core that is separate from the first chiplet, data within the first sub-portion configured as directly-accessible memory.

6. The method of claim 5, further comprising:

performing machine learning operations that consume the data as input.

7. The method of claim 6, wherein the machine learning operations comprise matrix multiplication operations.

8. The method of claim 1, wherein:

the first chiplet includes a first portion that comprises a first amount of memory of an internal memory of the first chiplet; and the method further comprises: while performing caching operations via the first portion, performing machine learning operations with a second portion of the memory configured as directly-accessible memory.

9. A device comprising:

one or more machine learning accelerators; and a chiplet memory of a first chiplet, configured to;

perform caching operations via a first portion of a cache that is present in the chiplet memory of the first chiplet, the first chiplet acting as an interface between an accelerator and a system memory, the caching operations being performed as part of a cache hierarchy of the accelerator;

in response to a request for additional directly-accessible memory, for use by an accelerator, within the chiplet memory, reconfigure at least a first sub-portion of the first portion of the cache from being used as a cache to being used as directly-accessible memory, wherein the accelerator is configured to perform machine learning operations and to store input operands and output results into the directly-accessible memory;

access the first sub-portion by the accelerator, wherein the accessing includes the accelerator explicitly requesting data be stored into or loaded from the first sub-portion, the explicitly requesting specifying an address within the first sub-portion; and transmit data to or receiving data from a second chiplet that is physically separate from a processing core that requests the first chiplet to perform machine learning operations, wherein the data is transmitted or received via a direct connection between the first chiplet and the second chiplet that does not flow through the processing core.

10. The device of claim 9, wherein:

performing caching operations comprises performing caching operations for a processing core that is on a separate die as the chiplet memory.

11. The device of claim 10, wherein:

performing caching operations for the processing core comprises one or more of storing a cache line evicted from a cache of the processing core or providing a cache line to the processing core in response to a miss in a cache of the processing core.

12. The device of claim 9, wherein:

configuring the first sub-portion as directly-accessible memory is performed in response to a request from a scheduler or a compute unit of a processing core that is on a separate die as the chiplet memory.

13. The device of claim 9, wherein the chiplet memory is further configured to:

store, in response to a request of a processor core that is separate from the first chiplet, data within the first sub-portion configured as directly-accessible memory.

14. The device of claim 13, wherein the chiplet memory is further configured to:

perform machine learning operations that consume the data as input.

15. The device of claim 14, wherein the machine learning operations comprise matrix multiplication operations.

16. The device of claim 9, wherein:

the chiplet memory includes a first portion that comprises a first amount of memory of an internal memory of the first chiplet; and the one or more machine learning accelerators are configured to: while caching operations are being performed via the first portion, perform machine learning operations with a second portion of the memory configured as directly-accessible memory.

17. A device, comprising:

a first chiplet including a first chiplet memory and a first set of one or more machine learning accelerators;

a second chiplet; and a processing core, wherein the first chiplet is configured to:

perform caching operations via a first portion of a cache that is present in the first chiplet, the first chiplet acting as an interface between an accelerator and a system memory, the caching operations being performed as part of a cache hierarchy of the accelerator;

in response to a request for additional directly-accessible memory for use by an accelerator within the first chiplet memory, reconfigure at least a first sub-portion of the first portion of the cache from being used as a cache to be used memory as directly-accessible memory, wherein the accelerator is configured to perform machine learning operations and to store input operands and output results into the directly-accessible memory;

access the first sub-portion by the accelerator, wherein the accessing includes the accelerator explicitly requesting data be stored into or loaded from the first sub-portion, the explicitly requesting specifying an address within the first sub-portion; and transmit data to or receiving data from a second chiplet that is physically separate from a processing core that requests the first chiplet to perform machine learning operations, wherein the data is transmitted or received via a direct connection between the first chiplet and the second chiplet that does not flow through the processing core.

18. The device of claim 17, wherein:

performing caching operations comprises performing caching operations for the processing core.

* * * * *